Dec. 15, 1942. L. E. BANGERT 2,304,873
LAWN MOWER ATTACHMENT
Filed April 30, 1941
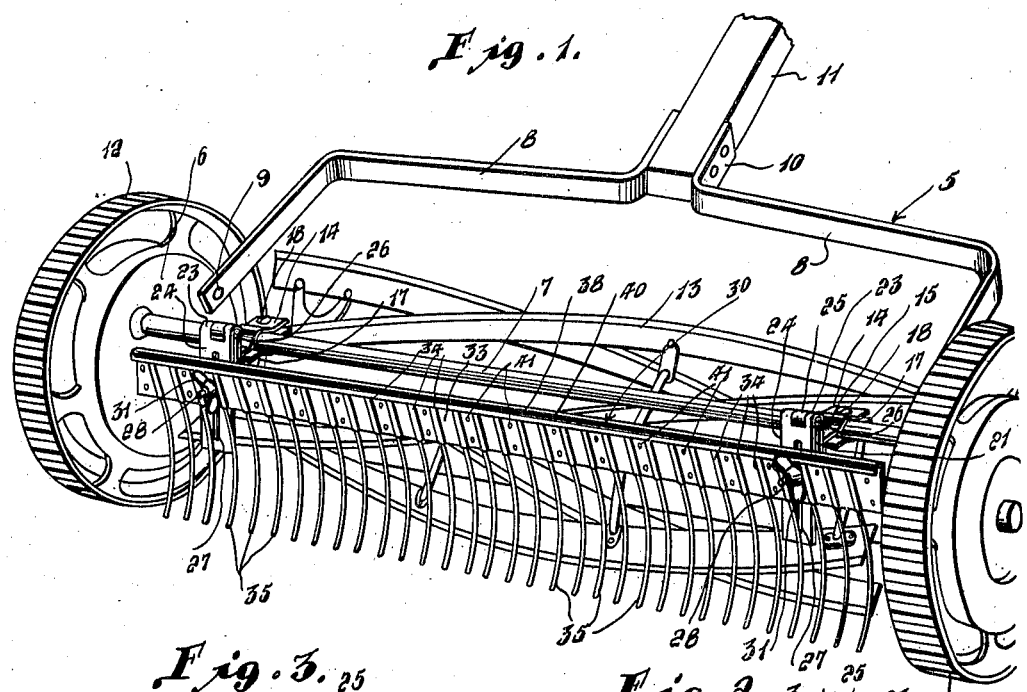
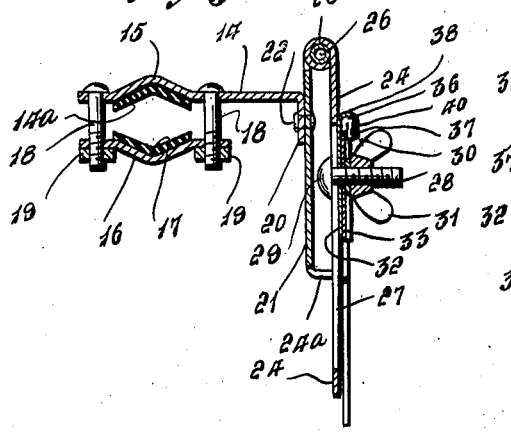
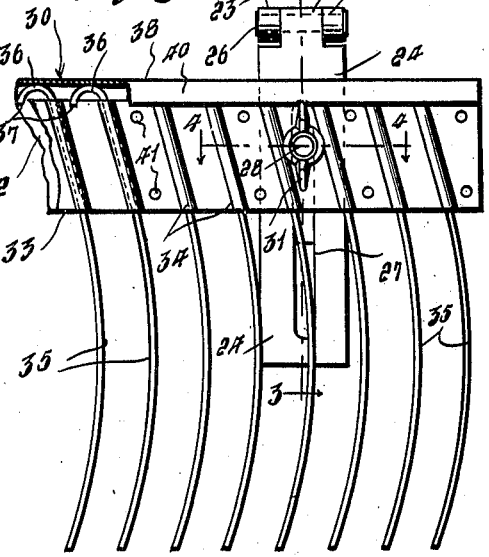
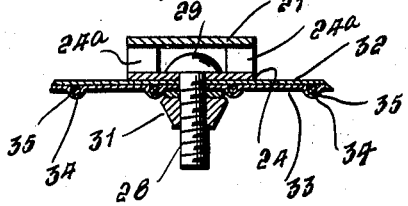
Inventor
Lawrence E. Bangert Patented Dec. 15, 1942

2,304,873

UNITED STATES PATENT OFFICE 2,304,873

LAWN MOWER ATTACHMENT

Lawrence E. Bangert, Richmond Hill, N. Y.

Application April 30, 1941, Serial No. 391,200

9 Claims. (Cl. 56—249)

The present invention relates to improvements in lawn mover attachment, similar to my application, Serial No. 301,664, filed October 27, 1939, now Patent No. 2,256,255, granted September 16, 1941.

The primary object of the invention is to provide a lawn rake attachment for lawn mowers, both hand and power, having a brush bar preceding rotary blades, which may be readily and easily attached to one of the frame bars of the mower without requiring alterations or changes to the mower structure.

A further object of the invention is to provide a rake attachment for a lawn mower which is hinged to swing on a horizontal axis so that the ends of the rake tines will move away from the ground line when the mower is moved rearwardly and to swing toward the ground line when the mower is moved forwardly.

A still further object of the invention is to provide means for adjusting each end of the rake bar with respect to the ground line independent of the hinge supporting means attached to the mower whereby adjustment of the rake bar and tines may be had without altering the position of the attaching brackets.

A still further object of the invention is to provide a rake attachment for lawn mowers in which the resilient tines of the rake are curved in a direction at right angles to the travel of the rake to provide increased tine lengths for greater pick-up of weeds, crab grass and the like and also allow the tines to straighten out and be relieved by such tine movements.

A still further object of the invention is to provide a rake attachment for lawn mowers having the tines arcuately curved in the same plane with their upper ends anchored against rotation whereby the tines will be maintained in their correct position.

Other objects and advantages of the invention will become apparent during the course of the following description of the accompanying drawing, wherein, Figure 1 is a perspective view of a mower, illustrating the manner in which the rake attachment, embodying the present invention, is secured thereto;

Figure 2 is an enlarged fragmentary detail view of the rake attachment illustrating the specific structure of one of the adjustable supporting brackets;

Figure 3 is a vertical cross-sectional view taken on line 3—3 of Figure 2, looking in the direction of the arrows, showing in detail the construction of one of the supporting brackets for the rake bar; and Figure 4 is a horizontal cross-sectional view taken on line 4—4 of Figure 2, looking in the direction of the arrows, showing the manner in which the rake bar is spaced from the supporting bracket so as not to interfere with the adjustment of the rake bar.

In the drawing, wherein for the purpose of illustrating the invention and wherein like reference characters will be employed to designate like parts throughout the same, the reference character 5 will generally be employed to designate a lawn mower embodying opposed frame plates 6 connected by a frame bar 7. Angle brackets 8 are attached to the circular frame plates 6, as at 9, so that the opposite ends of the brackets, as at 10, may connect to a handle 11. Traction wheels 12 are rotatably mounted with respect to the circular frame plates 6 and a cutting reel 13 is rotatably supported between the circular frame plates 6 so that it may be rotated by suitable gearing, carried by the circular frame plates 6 and interposed between traction wheels 12 and the cutting reel 13.

The above structure is typical of present-day domestic lawn mowers and the invention comprises a pair of bracket members 14, slightly offset and curved at one end as at 15 to conform generally to the circular shape of the frame bar 7 to which it is attached by means of an anchoring plate 16 having a similar offset curved portion 17 extending in the opposite direction. Bolts 18 extend through the plate portions of the bracket members 14 and anchor plates 16 so that nuts 19 may be threaded on the ends thereof to draw the bracket member and clamping plate 16 tightly around the frame bar 7. To prevent slipping of the bracket members 14 and clamping plates 16, the opposed faces thereof are preferably coated with live rubber as shown at 14a in Figure 3.

One end of the clamping bracket member 14 is angularly bent as at 20, to which is attached a plate 21, as by means of a rivet, bolt or spot welded connection 22. One end of the vertical plate 21 is provided with spaced hinge leaves 23, while the opposite end is provided with a pair of spaced outwardly projecting lugs 24a terminating in vertical alignment with the circumference of the hinged leaves 23. A rake bar supporting strap 24 is provided at each end with a hinged leaf 25 adapted to be positioned between the hinge leaves 23 of the vertical plate 21 so that a hinge pintle 26 may be passed through the leaves, whereby the strap 24 will hingedly depend from the upper end of the vertical plate 21.

It will be noted that the hinged strap 24 extends a considerable distance below the lower edge of the vertical plate 21 and will have its rear face engaged by the forwardly projecting lugs 24a so that the strap 24 will be held in spaced relation from the vertical plate 21. Extending throughout the length of the strap 24 and terminating adjacent each end is a slot 27 in which is slidably mounted a bolt 28, having its head 29, slidably positioned on one side of the strap 24 between the strap and the vertical plate 21. A rake bar 30 is adapted to be supported by the bolt 28 extending through an opening adjacent each end thereof and a wing nut 31 is threaded on the bolt 28 to lock the rake bar 30 in an adjusted position.

The rake bar comprises a pair of plates 32 and 33, the latter having angularly disposed ribs 34 for receiving the upper ends of arcuately curved resilient, preferably spring steel rake tines 35, preferably curved in cross-section with the extreme upper ends 36 of the rake tines bent downwardly, as at 37, to one side of the ribs 34. The upper edge of the plate 32 is bent upon itself, as at 38, and is return bent, as at 40, to substantially cover the return bent ends 37 of the rake tines 35.

Rivets or spot welds 41 may be employed for securely holding the plates 32 and 33 securely together so that the upper ends of the tines 35 will be locked therein. In this manner, the rake tines 35 will be held against rotation and the arcuate portions will be maintained in the same general plane at right angles to the direction of travel of the rake.

It will be readily observed that during the forward motion of the mower, the depending strap 24 will be held in a vertical plane by contacting the outwardly projecting lugs 24a and that during rearward travel of the mower, the rake 30 will swing away from the mower and prevent the lower ends of the tines 35 from raking in a reverse direction.

The rake may be vertically adjusted relative to the supporting straps 24, the space between the abutment lugs 24a providing clearance for the bolt head 29 so that the retaining bolts 28 for the valve may move below the vertical plates 21. When desired, the rake may be swung upwardly and rearwardly upon its hinged mounting and the mower used without the rake attachment.

It is to be understood that the form of the invention herewith shown and described is to be taken as the preferred example of the same and that various changes in the shape, size and arrangement of parts may be resorted to without departing from the spirit and scope of the invention as claimed.

I claim:

1. In a rake for a lawn mower wherein the mower has a frame bar, a bracket clamped to each end of the frame bar, a vertical plate secured to each bracket having an outwardly projecting lug at the lower end thereof, a strap pivoted to the upper end of the vertical plate adapted to move toward and away from the outwardly projecting lug with the lug spacing the plates at all times, a rake bar adjustably secured to the depending plate, the adjustable securing means having a part thereof disposed and movable in the space between said plates.

2. A rake for lawn mowers, comprising a pair of brackets for attachment adjacent each end of the lawn mower frame bar, a vertical plate secured to each bracket having a pair of outwardly projecting lugs at one end thereof, and a depending strap pivoted to the opposite end of the vertical plate to swing toward and away from the lugs, and a rake bar adjustably secured to the depending strap.

3. In a lawn mower having a frame bar, a pair of brackets clamped adjacent each end of the frame bar, a vertical plate secured to each bracket having a pair of outwardly projecting lugs at one end thereof, a depending strap pivotally attached to the upper end of the vertical plate to swing toward and away from the lugs, a bolt having its head housed between the vertical plate and depending strap and a rake bar detachably secured by the bolt to the depending strap.

4. In a rake for a lawn mower wherein the mower has a frame bar, a bracket clamped adjacent each end of the frame bar, a vertical plate attached to each bracket, a pair of lugs formed at one end of the plate, extending outwardly therefrom, a depending strap having a longitudinal slot pivoted to the opposite end of the plate whereby the strap will be spaced from the vertical plate, a bolt slidably mounted in the longitudinal slot, having its head housed between the vertical plate and depending strap and a rake bar removably attached by the bolt to the depending strap.

5. In a rake for a lawn mower, wherein the mower has a frame bar connecting the circular frame plates of the mower, a bracket clamped to each end of the frame bar, a vertical plate having a pair of outwardly projecting lugs carried by each bracket, a depending strap pivoted to the upper end of each vertical plate and adapted to swing toward and away from the outwardly projecting lugs, a bolt having its head housed between the vertical plate and depending strap and slidable longitudinally in a slot in the depending plate, a frame rake bar carried by the bolt and arcuately curved rake tines secured to the rake bar, said tines being curved in a direction at right angles to the travel of the rake.

6. In a rake attachment for a lawn mower, wherein the mower has a frame bar, a bracket secured to each end of the frame bar, a depending vertical plate carried by each bracket, a depending strap pivoted to the upper end of the depending vertical plate, a bolt slidably mounted in a slot in the depending plate, having its head housed between the depending vertical plate and depending strap, a rake bar secured by the bolt to the depending strap comprising a pair of plates secured together, one of said plates having angularly disposed ribs for receiving the upper ends of rake tines, the other plate having its upper edge bent over the extreme ends of the rake tines to lock the same against rotation and said rake tines being curved and their ends facing downward in a direction at right angles to their travel.

7. In a rake attachment for a lawn mower, wherein the mower has a frame bar, a bracket clamped adjacent each end of the frame bar, a vertical plate having outwardly projecting lugs carried by each bracket, a strap depending from the upper end of the vertical plate adapted to move toward and away from the outwardly projecting lugs, a bolt having its head housed between the vertical plate and depending strap adapted to operate in a longitudinal slot in the strap, a rake bar removably attached to the depending strap by said bolt, said rake bar comprising a pair of plates secured together throughout their lengths, ribs formed in one of the plates, arcuately curved rake tines having their upper ends passing between the ribs formed in one of the plates with the extreme upper end of each rake tine return bent, an extension formed on the other rake bar plate confining the return-bent ends of the rake tines and said rake tines being curved in a direction at right angles to the travel of the mower.

8. A rake for lawn mowers comprising a pair of brackets adapted for attachment to the frame bar of a lawn mower, a vertical plate carried by each bracket, a pair of spaced lugs projecting forwardly of the lower edge of said plate and defining a space therebetween, a depending strap hinged at its upper end to the upper end of the plate and of greater length than said plate and abuttingly engageable with said lug intermediate its upper and lower ends, said strap having a longitudinally extending slot therein registering with the space between said lugs and extending below said lugs, a rake bar attached to the depending strap of each bracket and means for vertically adjusting the rake bar on the depending straps movable through the slots of said straps and through the spaces between said lugs.

9. A rake for lawn mowers comprising a pair of brackets adapted for attachment to the frame bar of a lawn mower, a vertical plate carried by each bracket, a pair of spaced lugs projecting forwardly of the lower edge of said plate and defining a space therebetween, a depending strap hinged at its upper end to the upper end of the plate and of greater length than said plate and abuttingly engageable with said lug intermediate its upper and lower ends, said strap having a longitudinally extending slot therein registering with the space between said lugs and extending below said lugs, a rake bar attached to the depending strap of each bracket and means for vertically adjusting the rake bar on the depending straps movable through the slots of said straps and through the spaces between said lugs, said adjusting means comprising headed screw bolts having the shanks extending through the strap slots with the heads of the bolts disposed between the plates and straps.

LAWRENCE E. BANGERT.